United States Patent [19]

Gölz et al.

[11] Patent Number: 5,628,529
[45] Date of Patent: May 13, 1997

[54] ADJUSTER DEVICE FOR A DEFLECTOR FITTING

[75] Inventors: Ulrich Gölz, Schechingen; Tanja Maier, Leinzell; Erwin Bühr, Schwäbisch Gmünd, all of Germany

[73] Assignee: TRW Occupant Restraint Systems GmbH, Alfdorf, Germany

[21] Appl. No.: 538,908

[22] Filed: Oct. 4, 1995

[30] Foreign Application Priority Data

Oct. 7, 1994 [DE] Germany .......... 44 35 910.1

[51] Int. Cl.⁶ .......... B60R 22/20
[52] U.S. Cl. .......... 280/801.2; 280/808
[58] Field of Search .......... 280/801.2, 801, 280/808

[56] References Cited

U.S. PATENT DOCUMENTS 4,173,357  11/1979  Jahn et al. .......... 280/801.2
4,846,498  7/1989  Föhl .......... 280/801.2
5,102,166  4/1992  Bogner .......... 280/801.2

FOREIGN PATENT DOCUMENTS 0277550  1/1988  European Pat. Off. .
4101008  8/1991  Germany .

Primary Examiner—Kenneth R. Rice
Attorney, Agent, or Firm—Tarolli, Sundheim, Covell, Tummino & Szabo

[57] ABSTRACT

An adjuster device for a deflector fitting of a vehicular seat belt system comprises a first cable (28) connected to a longitudinally adjustable vehicle seat and guided to the circumference of a first pulley (26) and a second cable (18) connected to the deflector fitting and guided to the circumference of a second pulley (24). The pulleys (24, 26) are tensioned one against the other by a spiral spring (36) and coupled to rotate with respect to each other so that overloading of all and any of the components of the adjuster device is avoided.

12 Claims, 6 Drawing Sheets

ADJUSTER DEVICE FOR A DEFLECTOR FITTING

The present invention relates to an adjuster device for a deflector fitting of a vehicular seat belt system.

An adjuster device known from EP 0 277 550 B1 serves the purpose of adapting the height of the deflector fitting in synchronism to the longitudinal adjustment of the vehicle seat. For obvious reasons of safety seat adjustment is to be undertaken with the vehicle stationary. Should this nevertheless be undertaken with the vehicle on the move heavy accelerations may occur at the vehicle seat when the vehicle is sharply decelerated at the same time and the vehicle seat is suddenly arrested in a latch. This action may cause the cable connected to the vehicle seat to become detached. When, on top of this, the deflector fitting is blocked, overloading of the cable occurs which may result in it rupturing. In both cases shop repair is necessary.

The invention improves the adjuster device in that both detachment of the cable from the vehicle seat and overloading of the cable are avoided under all circumstances. In accordance with the invention, the adjuster device comprises a first pulley, a first cable section connected to the deflector fitting and circumferentially engaging the first pulley, a second pulley having an outer diameter greater than that of the first pulley, and a second cable section circumferentially engaging the second pulley and connected to the longitudinally adjustable vehicle seat. The pulleys are drivingly coupled with each other by a spring means which yields when torque transmitted between the pulleys exceeds a predetermined amount to permit relative rotation between the pulleys. Accordingly, between the two pulleys torque-limiting takes place, by means of which sudden peak tension loads are eliminated from the cables. Thus, even in extreme situations, no overloading and certainly no damage can occur to the components of the system, and as well, any detachment of the cable from the vehicle seat is avoided. By dimensioning the spring force produced by the spring means, the torque is determined as of which torque limiting is active.

In the preferred embodiment the two pulleys are provided with stops tensioned one against the other by the spring means, and preferably a first stop acts on the first pulley having a second stop on a rotatable stop disc and a third stop on the second pulley having a fourth stop on the stop disc. Accordingly, practically two complete revolutions of the larger first pulley are available for torque limitation, which is thus assured over the total adjustment stroke of the vehicle seat.

Furthermore, in the preferred embodiment the spring means constitutes a spiral spring, the outer end of which is coupled to the first pulley and the inner end of which is coupled to the second pulley; the spiral spring is accommodated in a spring housing to which the outer end of the spiral spring is connected and which is adjustably coupled to the first pulley by spline toothing. Adjusting the spring force to the desired value is then possible by simply turning the spring housing relative to the first pulley.

An embodiment of simple design and achievable with little effort is afforded in conclusion by the second pulley having an axial journal on which, on the one hand, the second pulley is mounted in a housing surrounding the first pulley and on which, on the other, the second pulley is rotatably mounted, particularly when on the journal the stop disc is also rotatably mounted.

Further features and benefits of the invention result from the following description of a preferred embodiment and from the drawing to which reference is made and in which.

Figure 1:
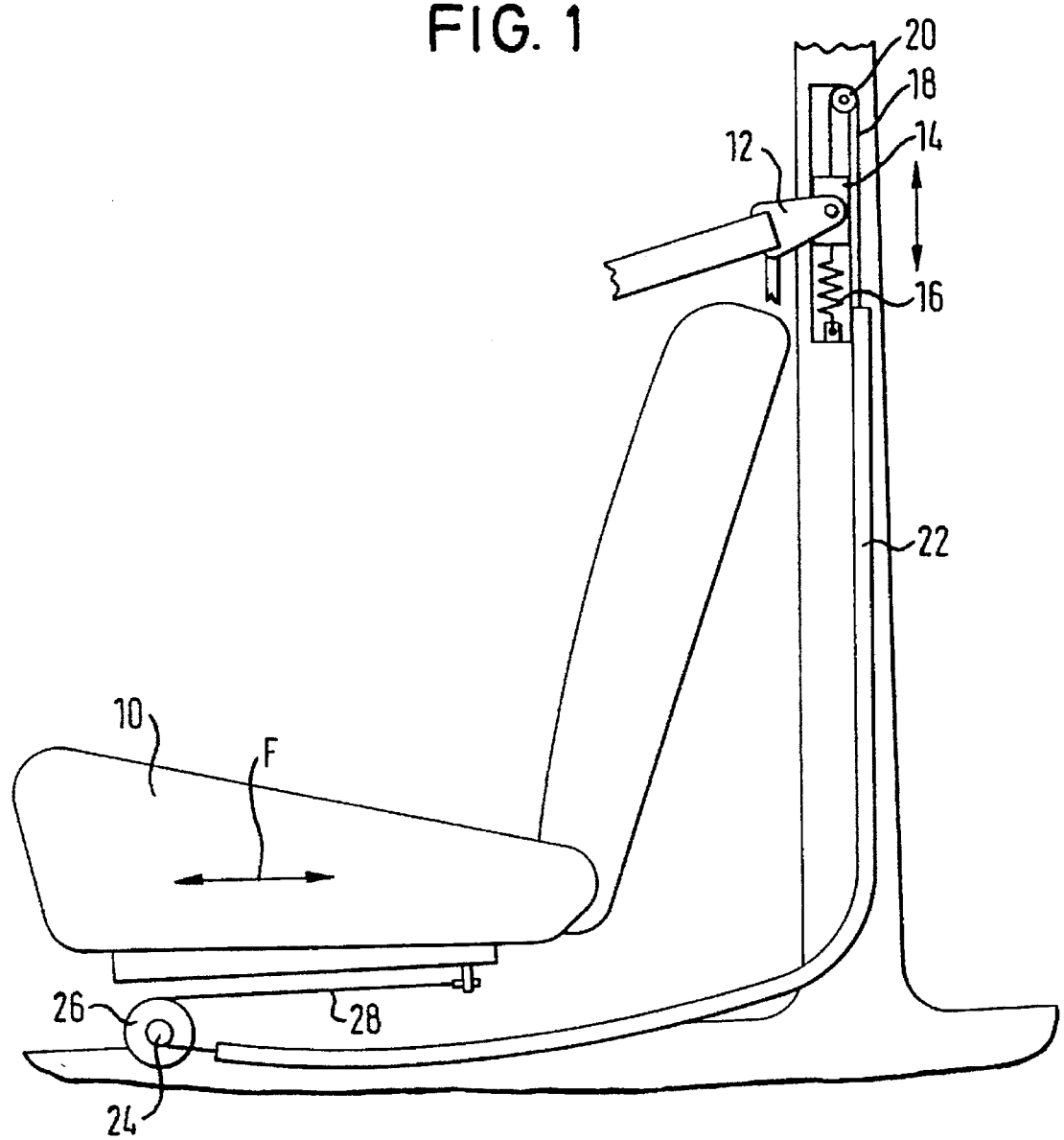
FIG. 1 is a schematic side view of a longitudinally adjustable vehicle seat with a height-adjustable deflector fitting and an adjusting device for the same.

The front seats in a motor vehicle are usually adjustable in the longitudinal direction of the vehicle. The vehicle seat 10 shown in FIG. 1 is adjustable in the direction of a double arrow F. At the same time a deflector fitting 12 of a three-point seat belt is adjusted in height. The deflector fitting 12 is anchored on a slider 14 which is adjustably guided more or less vertically on the center column of the vehicle. The slider 14 is spring-loaded in the direction of the vehicle floor by a tension spring 16 and may be latched vehicle-sensitive in its position in each case.

To adjust the height of the deflector fitting 12 a cable 18 is connected to the slider 14, this cable being guided over a return pulley 20. By means of an outer jacket 22 the cable 18 is guided to the circumference of a pulley 24 which is coupled to a pulley 26 having a larger diameter. A further cable 28 is connected to the underslide of the vehicle seat 10 and guided to the outer circumference of the pulley 26. The pulleys 24 and 26 form a means of reduction which converts the adjustment travel of the vehicle seat 10 into a reduced vertical stroke of the deflector fitting 12.

Figure 2:
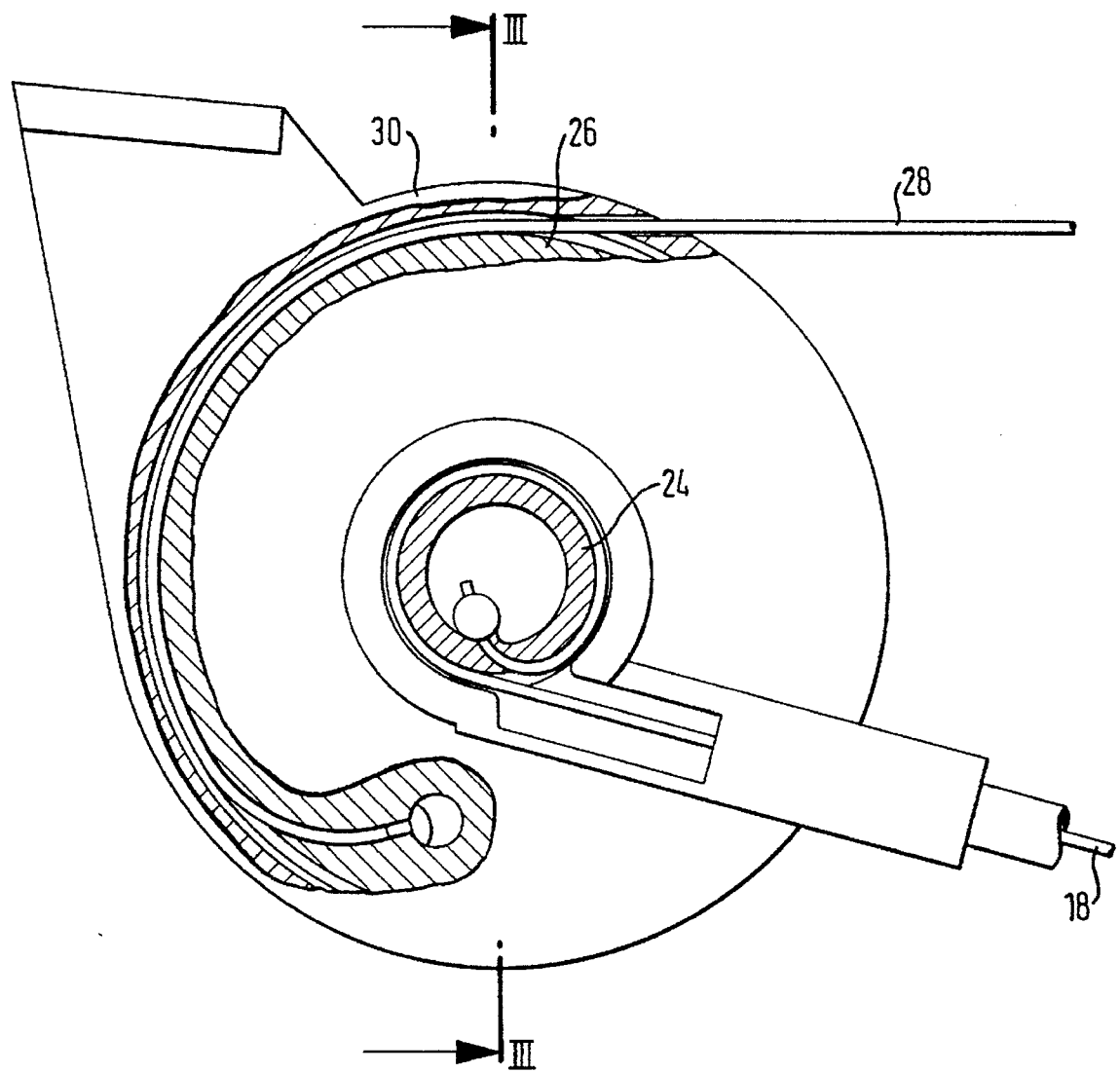
FIG. 2 is a radial partial section of a reduction means with torque limiting.
Figure 3:
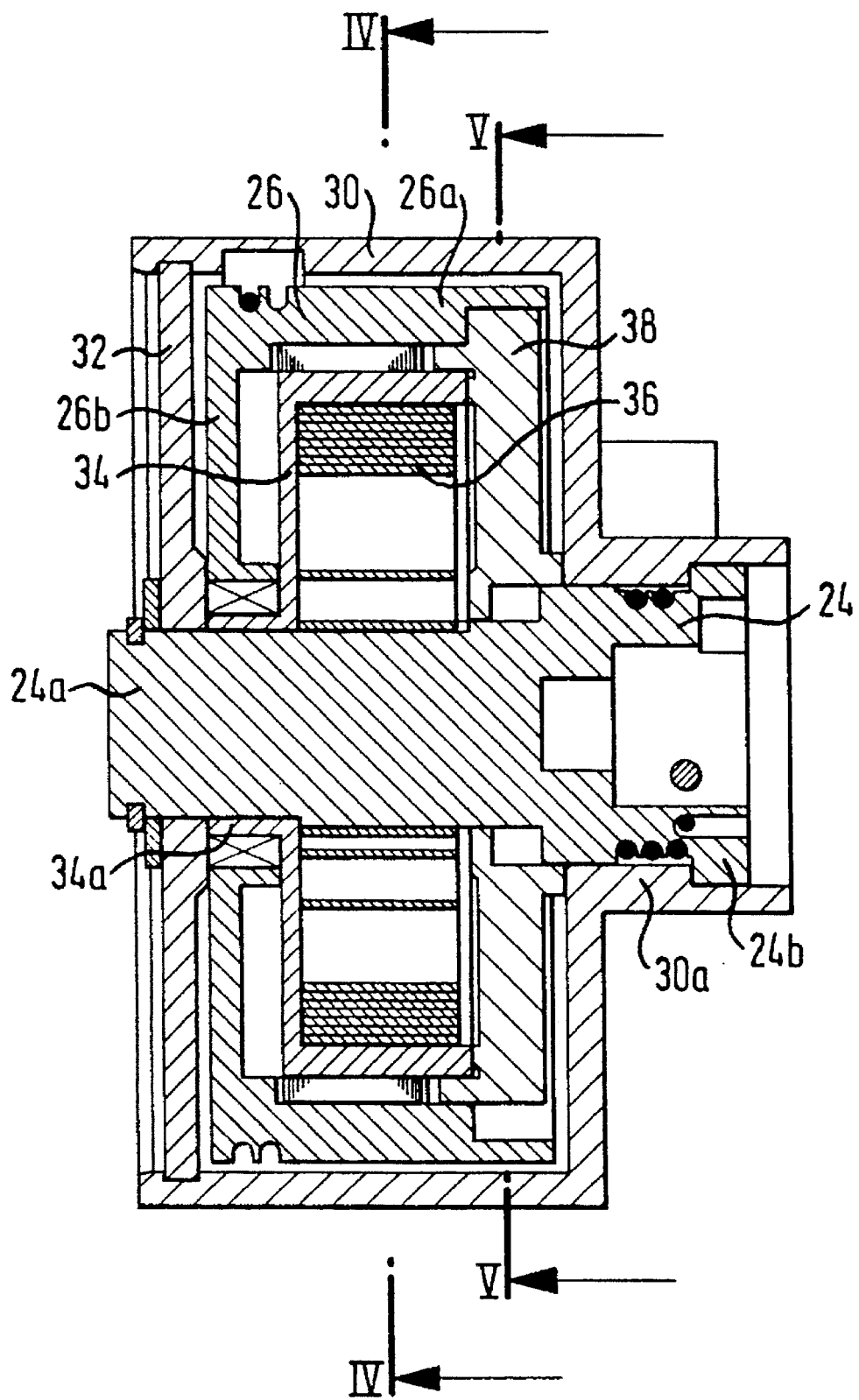
FIG. 3 is a section along line III—III in FIG. 2.

Fastening the cables 18, 28 to the outer circumference of the pulleys 24, 26 is shown in FIG. 2. The pulleys 24, 26 are, as shown in FIG. 3, accommodated in a primarily cylindrical housing 30, the open side of which is closed off by a cover 32. The pulley 24 is provided with an axial journal 24a which is rotatably mounted in an opening of the cover 32 and having at its opposite end a collar 24b of enlarged diameter for mounting and axially defining at a tubular side projection 30a of the housing 30.

Figure 4:
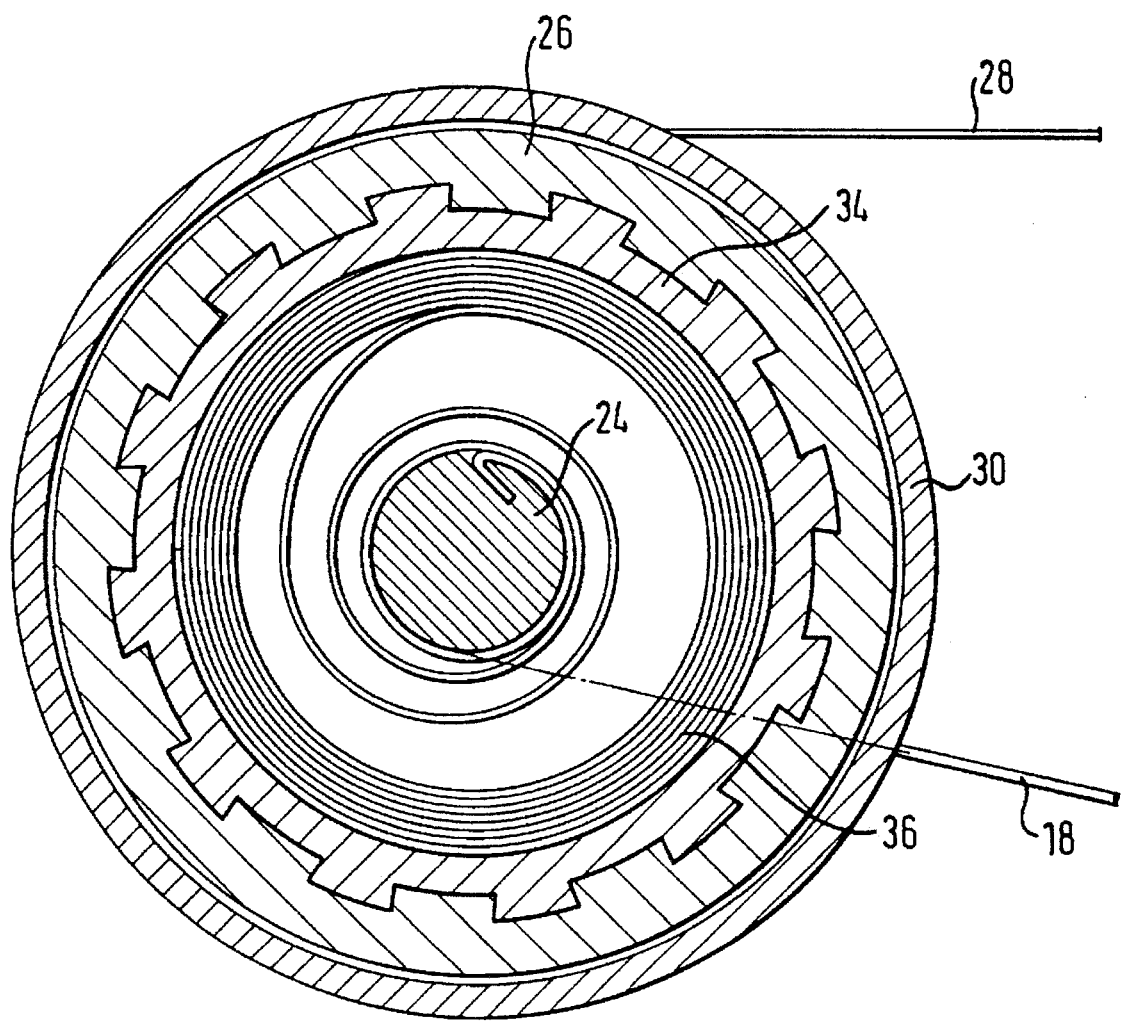
FIG. 4 is a section along line IV—IV in FIG. 3.

On the journal 24a a bell-shaped spring housing 34 is rotatably mounted. In the spring housing 34 a spiral spring 36 is accommodated, the inner end of which is connected to the pulley 24 and the outer end of which is connected to the spring housing 34. The pulley is formed hollow with a radial bearing flange 26a for rotatably mounting on a cylindrical bearing projection 34a of the spring housing and with a cylindrical jacket 26a which surrounds the spring housing 26a. As evident from FIG. 4, the jacket 26a features on its inside a spline toothing provided for positive engagement of a corresponding outer spline toothing of the spring housing 34.

Figure 5:
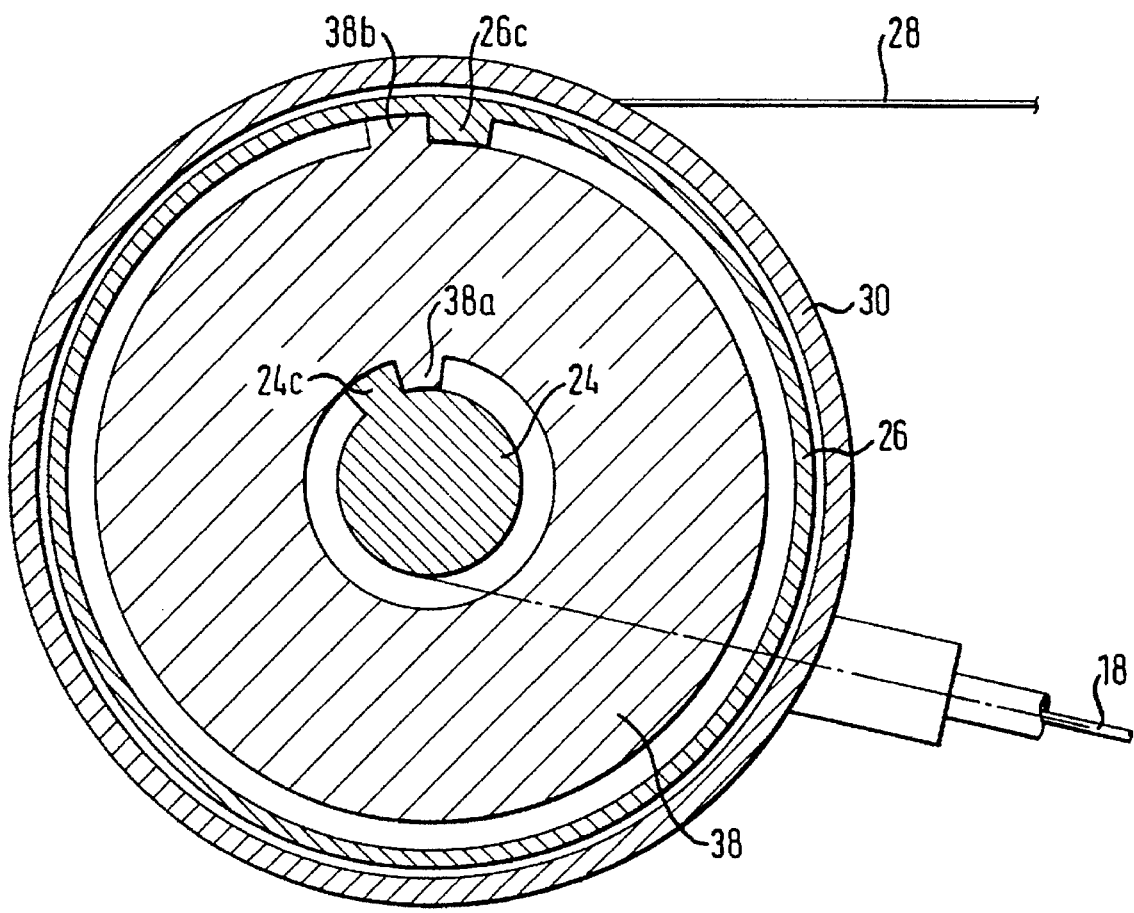
FIG. 5 is a section along line V—V in FIG. 3 in the normal condition.

On the journal 24a a stop disc is furthermore mounted free to rotate. As is evident from FIG. 5 this stop disc 38 features a radially inner stop cam 38a, against which a corresponding stop 24c of the pulley 24 rests, and a radially outer stop cam 38b, against which a corresponding stop 26c of pulley 26 rests.

Figure 6:
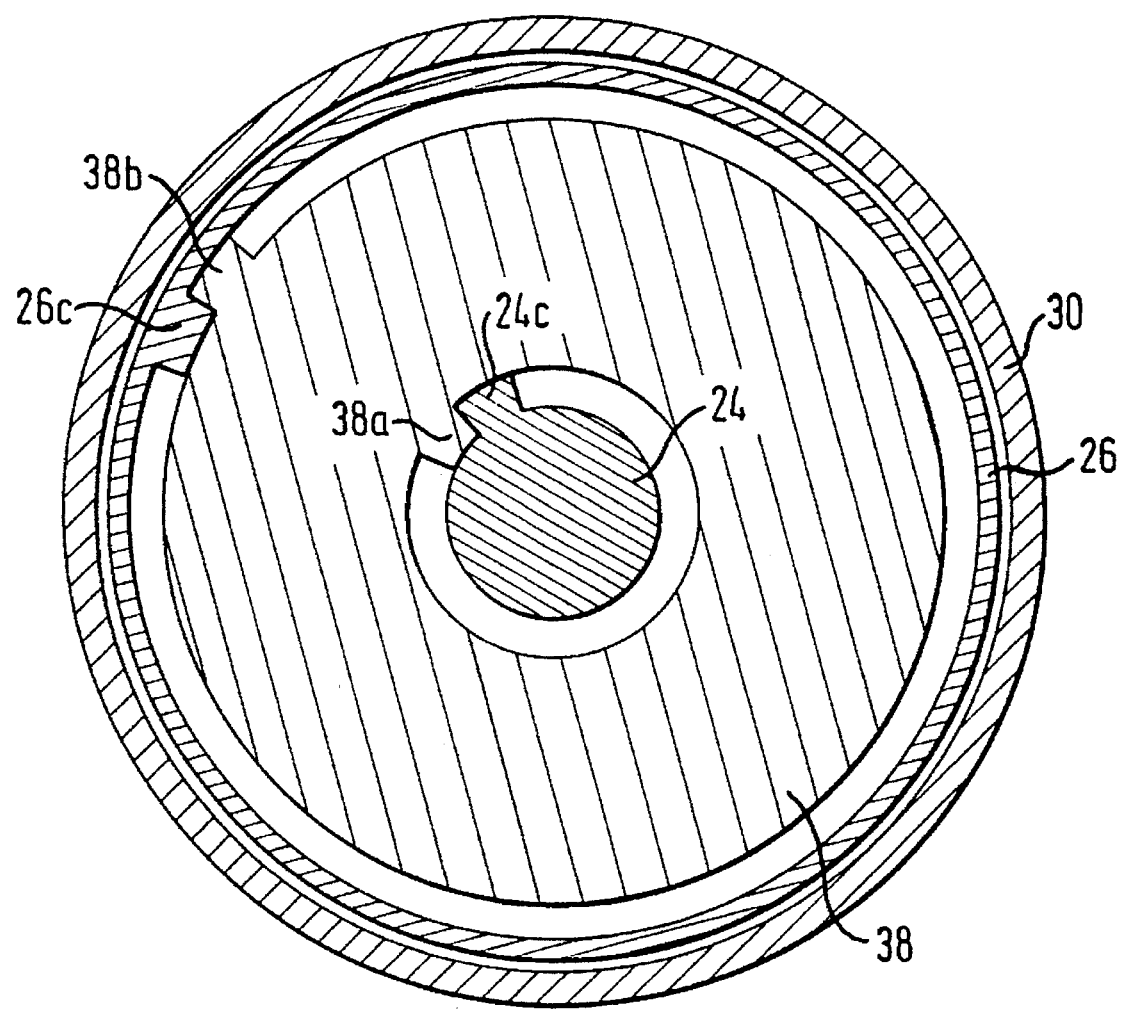
FIG. 6 is a section along line V—V in FIG. 3 in the overloaded condition.

The stop cams 38a and 38b are held in contact with the stops 24c and 26c by the spring force of the spiral spring 36, so that the pulleys 24, 26 are counter-tensioned with respect to each other lastly by the spiral spring 36 and coupled rotatably to each other up to a specific torque. If this torque—which can be adjusted by the rotary position of the spring housing 34 relative to pulley 26—is exceeded due to an excessive tension between the cables 18, 28, the spiral spring 36 yields and the pulleys 24c and 26c are counter-rotated with respect to each other, their stops 24c and 26c thereby releasing from the stop cams 38a, 38b. The pulleys 24, 26 may be counter-rotated with respect to each other by a maximum of approximately two revolutions, until the stops 24c, 26c again come up against the stop cams 38a, 38b, as shown in FIG. 6. The outer diameter of the pulley 26 is dimensioned so that less than two revolutions are necessary to retract the corresponding length of the cable 28 when the vehicle seat 10 is fully adjusted as far as it can travel.

Should now an abnormal tension occur in the cables 18, 28 during a sudden shift in seat position or blocking of the deflector fitting 12, then the pulleys 24, 26 are merely counter-rotated with respect to each other, thus reliably preventing overloading of all and any components of the adjuster device.

What is claimed is:

1. An adjuster device for a deflector fitting in a vehicular seat belt system, comprising a first pulley, a first cable section connected to said deflector fitting and circumferentially engaging said first pulley, a second pulley mounted rotatably with respect to said first pulley and having an outer diameter greater than that of said first pulley, a second cable section circumferentially engaging said second pulley and connected to a longitudinally adjustable vehicle seat, and coupling means drivingly interconnecting said first and second pulleys for joint rotation, said coupling means yielding under a predetermined torque transmitted between said first and second pulleys allowing relative rotation therebetween.

2. The adjuster device of claim 1 wherein said coupling means is a spiral spring having an inner end connected to said first pulley and an outer end coupled to said second pulley.

3. The adjuster device of claim 2 wherein said spiral spring is accomodated in a spring cage whereto the outer end of said spiral spring is connected.

4. The adjuster device of claim 3 wherein said spring cage has outer splines and said second pulley has internal splines adjustably engaged with said outer splines on the spring cage.

5. The adjuster device of claim 1 wherein said first and second pulleys are rotatably accomodated in a housing and said first pulley is integrally formed with an axial journal rotatably mounted in said housing, said second pulley being rotatably mounted on said journal.

6. The adjuster device of claim 1 wherein relative rotation between said first and second pulleys is limited by abutment members provided on said pulleys.

7. The adjuster device of claim 6 wherein said first and second pulleys are mounted about a common axis whereon a stop disc is also rotatably mounted, said stop disc carrying abutment members for cooperation with said abutment members on said pulleys.

8. An adjuster device for a deflector fitting in a vehicular seat belt system, comprising a first pulley, a first cable section connected to said deflector fitting and circumferentially engaging said first pulley, a second pulley having an outer diameter greater than that of said first pulley, a second cable section circumferentially engaging said second pulley and connected to a longitudinally adjustable vehicle seat, and coupling means drivingly interconnecting said first and second pulleys for joint rotation, said coupling means yielding under a predetermined torque transmitted between said first and second pulleys allowing relative rotation therebetween, said coupling means being a spiral spring having an inner end connected to said first pulley and an outer end coupled to said second pulley.

9. The adjuster device of claim 8 wherein said spiral spring is accommodated in a spring cage whereto the outer end of said spiral spring is connected.

10. The adjuster device of claim 9 wherein said spring cage has outer splines and said second pulley has internal splines adjustably engaged with said outer splines on the spring cage.

11. An adjuster device for a deflector fitting in a vehicular seat belt system, comprising a first pulley, a first cable section connected to said deflector fitting and circumferentially engaging said first pulley, a second pulley having an outer diameter greater than that of said first pulley, a second cable section circumferentially engaging said second pulley and connected to a longitudinally adjustable vehicle seat, and coupling means drivingly interconnecting said first and second pulleys for joint rotation, said coupling means yielding under a predetermined torque transmitted between said first and second pulleys allowing relative rotation therebetween, the relative rotation between said first and second pulleys being limited by abutment members provided on said pulleys.

12. The adjuster device of claim 11 wherein said first and second pulleys are mounted about a common axis whereon a stop disc is also rotatably mounted, said stop disc carrying abutment members for cooperation with said abutment members on said pulleys.

\* \* \* \* \*